US006772217B1

(12) United States Patent
Baumann et al.

(10) Patent No.: US 6,772,217 B1
(45) Date of Patent: Aug. 3, 2004

(54) INTERNET BACKBONE BANDWIDTH ENHANCEMENT BY INITIATING AN ADDITIONAL DATA STREAM WHEN INDIVIDUAL BANDWIDTH ARE APPROXIMATELY EQUAL TO THE BACKBONE LIMIT

(75) Inventors: Gerald Walter Baumann, Boulder, CO (US); Terry Dwain Escamilla, Boulder, CO (US); Grant Douglas Miller, Littleton, CO (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 09/644,494

(22) Filed: Aug. 23, 2000

(51) Int. Cl.[7] .............................................. G06F 15/16
(52) U.S. Cl. ....................... 709/232; 709/231; 709/233; 709/226; 370/395.41; 379/114.07; 725/96
(58) Field of Search ................................ 709/231, 232, 709/233, 226; 370/395.41, 536, 84; 725/96; 379/114.07

(56) References Cited

U.S. PATENT DOCUMENTS

| | | | | |
|---|---|---|---|---|
| 4,893,305 | A | * | 1/1990 | Fernandez et al. .......... 370/254 |
| 5,559,798 | A | | 9/1996 | Clarkson et al. ........... 370/60.1 |
| 5,706,281 | A | | 1/1998 | Hashimoto et al. ......... 370/252 |
| 5,805,804 | A | * | 9/1998 | Laursen et al. ............. 709/223 |
| 5,859,853 | A | | 1/1999 | Carlson ...................... 370/468 |
| 6,023,475 | A | | 2/2000 | Tanaka et al. .............. 370/471 |
| 6,061,733 | A | * | 5/2000 | Bodin et al. ................ 709/233 |
| 6,219,669 | B1 | * | 4/2001 | Haff et al. ..................... 707/10 |
| 6,289,012 | B1 | * | 9/2001 | Harrington et al. ......... 370/389 |
| 6,339,785 | B1 | * | 1/2002 | Feigenbaum ................ 709/213 |
| 6,430,577 | B1 | * | 8/2002 | Hart ............................ 707/201 |
| 6,577,653 | B1 | * | 6/2003 | Rochberger et al. ........ 370/536 |
| 6,606,646 | B2 | * | 8/2003 | Feigenbaum ................ 709/203 |
| 6,614,366 | B2 | * | 9/2003 | Luby ............................ 341/50 |

FOREIGN PATENT DOCUMENTS

| | | | |
|---|---|---|---|
| EP | 0 924 902 A2 | 6/1999 | ........... H04L/12/56 |
| WO | WO 97/44942 | 11/1997 | ........... H04L/29/06 |

OTHER PUBLICATIONS

Yong liu et al. "On the impact of concurrent downloads", Simulation Conference, 2001. Proceedings of the Winter, vol.: 2, 9–12 Dec., pp. 1300–1305 Vol 2.*
IBM Technical Disclosure Bulletin, Dynamic Computation of TCP Maximum Window Size for Directly Connected Hosts, vol. 37, No. 04A, Apr. 1994, pp. 601–607.

* cited by examiner

Primary Examiner—Hosain Alam
Assistant Examiner—Liang-che Wang
(74) Attorney, Agent, or Firm—Bracewell & Patterson L.L.P.

(57) ABSTRACT

Available bandwidth utilization during transfer of large files over a TCP/IP network, is improved by segmenting the file and concurrently transmitting portions in an optimal number of logical distinct data streams which may all utilize a single physical medium and communications path. An initial number of data streams, is used to begin transmission of segments, each on a different data stream. During the first seconds of the transfer, individual and aggregate transmission bandwidths are determined, together with a backbone limit computed from the sliding window and round trip times. If the individual transmission bandwidths are approximately equal to the backbone limit, additional data stream(s) and segment(s) are started. Individual and aggregate transmission bandwidths are again determined, and the process is repeated until no substantial increase in aggregate bandwidth is achieved by adding an additional data stream. Aggregate transmission bandwidths are checked upon completion of each segment to determine if a data stream should be terminated.

31 Claims, 6 Drawing Sheets

INTERNET BACKBONE BANDWIDTH ENHANCEMENT BY INITIATING AN ADDITIONAL DATA STREAM WHEN INDIVIDUAL BANDWIDTH ARE APPROXIMATELY EQUAL TO THE BACKBONE LIMIT

BACKGROUND OF THE INVENTION

1. Technical Field

The present invention relates generally to data transfers in data processing system networks and in particular to transfer of large data blocks over the Internet or similar networks. Still more particularly, the present invention relates to utilizing parallel data transmission streams to improve bandwidth for transfers of large data bundles over the Internet.

2. Description of the Related Art

The Internet has become an important conduit for transmission and distribution of data (text, coded, image, video, audio, or mixed) and software. Users connect to the backbone with broadly divergent levels of performance, ranging from 14.4 Kb/s to more than 45 Mb/s. Moreover, Transmission Control Protocol/Internet Protocol (TCP/IP) has become a widely implemented standard communication protocol, enabling broad heterogeneity between clients, servers, and the communications systems coupling them.

The differences in equipment performance, user skill, and error rate (packet loss) necessitates monitoring of user data receipt and user response under the TCP/IP system. To accomplish this, TCP/IP establishes a "sliding window" which limits the maximum number of sequential bytes between the byte most recently from the server to the earliest byte for which a receipt acknowledge has not yet been received from the client. A variety of algorithms automatically re-send packets and slowly restart data transmission when the sliding window limit is exceeded. Thus, if the link between the server and client is shut down in the middle of transmission of a data collection, the server will stop sending packets within-one sliding window of the last packet acknowledged by the client.

This use of a sliding window inherently limits the bandwidth B of a data transfer through the backbone to the ratio:

$$B = \frac{\text{sliding window}}{\text{round trip time}}$$

where the sliding window is a number of bytes. The round trip time (which may be approximated by ping time) is the time for a packet to leave the sender, pass through the routers and firewalls for the sending enterprise's server, hop through the Internet backbone from one backbone operator to another, pass through the client's routers, and be received by the client, plus the time required for an acknowledgment to likewise pass between the client and server in the opposite direction.

One obvious component of round trip time is propagation time. Even with fiber optic cables, if the server and client are separated by 10,000 kilometers, the light pulses require 100 msec for the round trip. Another component to round trip time is transmission delays. If there are ten hops in each direction with 5 msec lost in transmission delay for each hop, another 100 msec is added to the round trip time. With additional delays from the response time at the client and any bandwidth limitations in the client and server infrastructure, a total round trip time on the order of 200 msec may be expected in such situations.

Ping times within the United States and Canada are typically on the order of 100 msec; ping times between the United States and western Europe or Japan are typically on the order of 200 msec. Typical default sliding windows in products such as IBM's AIX 4.3 (Berkeley configuration) are 16 KBytes. As a result, the maximum bandwidth achievable for such products is about 160 KB/sec (i.e., 1.28 Mb/sec) within the United States and about half that between the United States and western Europe or Japan. Even a single T1 connection provides greater bandwidth, and many enterprises have far more than single T1 line capacity.

One approach to improving bandwidth utilization for large data transfers is to set the sliding window to extremely high values. However, the sliding window must be reset in both the server and client systems, which is possible for special situations (e.g., particular, controlled transfers between commonly-owned or controlled systems) but not for the heterogenous Internet environment, where sliding windows within a large number of client systems cannot be automatically set to match the sliding window within the server system. In distributing software to thousands of customers, for example, a wide variety of operating systems is encountered, none of which allow outside control over the sliding window. Most users are unfamiliar with the controls enabling sliding windows to be reset to higher values. Moreover, increasing the sliding window to levels at which it no longer becomes the bandwidth-limiting factor would cause other serious problems to occur in servers and networks.

It would be desirable, therefore, to improve the bandwidth utilization in large data transfers without altering the default sliding window. It would further be advantageous for the data transfer to utilize a single physical channel for the transfer.

SUMMARY OF THE INVENTION

It is therefore one object of the present invention to improve data transfers in data processing system networks.

It is another object of the present invention to improve transfers of large data blocks over the Internet or similar networks.

It is yet another object of the present invention to utilize parallel data transmission streams to improve bandwidth for transfers of large data bundles over the Internet.

The foregoing objects are achieved as is now described. Available bandwidth utilization during transfer of large files over a TCP/IP network, ordinarily constrained by the sliding window and round trip times, is improved by segmenting the file and concurrently transmitting portions in logical distinct data streams which may all utilize a single physical medium and communications path. The file is segmented to support optimal transfer utilizing any number of concurrent data streams up to and including a maximum number, if specified. An initial number of data streams, which is one unless otherwise specified or determined, is used to begin transmission of segments, each on a different data stream. During the first seconds of the transfer, individual and aggregate transmission bandwidths are determined, together with a backbone limit computed from the sliding window and round trip times (approximated by ping time). If the individual transmission bandwidths are close to the backbone limit, additional data stream(s) and segment(s) are started. Individual and aggregate transmission bandwidths are again determined, and the process is repeated until no substantial increase in aggregate bandwidth is achieved by adding an additional data stream. Aggregate bandwidths are checked upon completion of each segment to determine if a data stream should be terminated.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

This invention is described in a preferred embodiment in the following description with reference to the figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code for remote execution. The method form of the invention may be practiced by combining one or more machine readable storage devices containing the code according to the present invention with appropriate standard computer hardware to execute the code contained therein. An apparatus for practicing the invention could be one or more computers and storage systems containing or having network access to computer program(s) coded in accordance with the invention.

Figure 1:
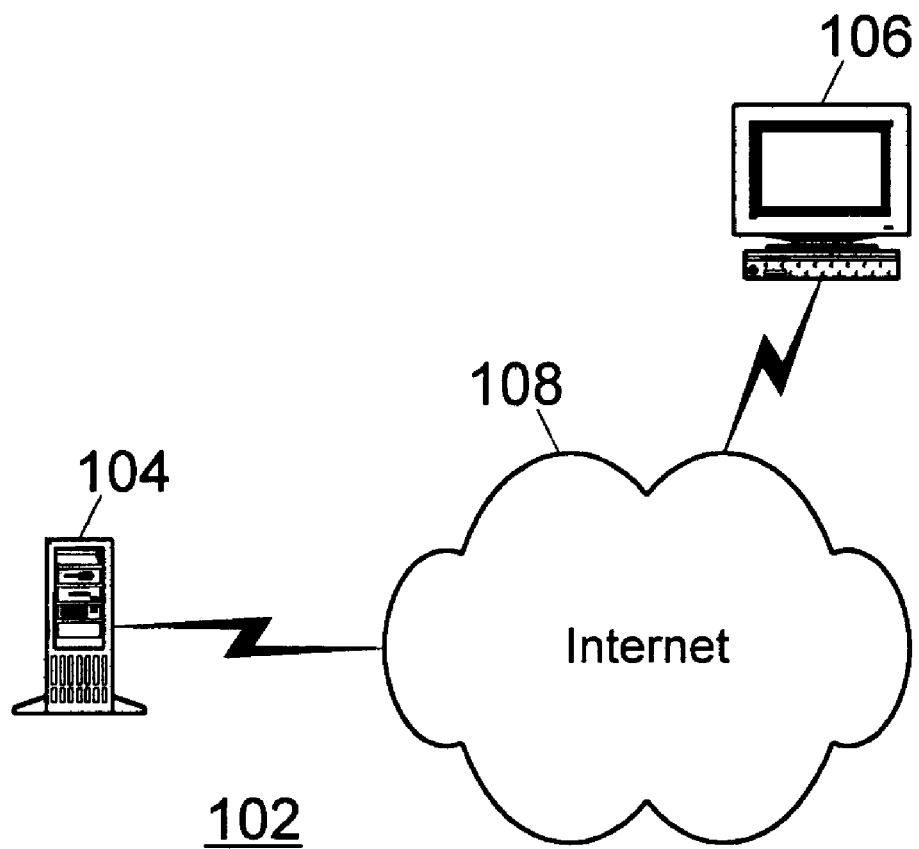
FIG. 1 depicts a data processing system network in which a preferred embodiment of the present invention may be implemented.

With reference now to the figures, and in particular with reference to FIG. 1, a data processing system network in which a preferred embodiment of the present invention may be implemented is depicted. Data processing system network 102 includes a server system 104 coupled to a client system 106 via the Internet 108. Data transfers between the server system 104 and client system 106 conform to the TCP/IP specification, as well as File Transfer Protocol (FTP), HyperText Transfer Protocol (HTTP), or some similar communications protocol. Large data transfers are performed in parallel segments as described in further detail below.

Figure 2:
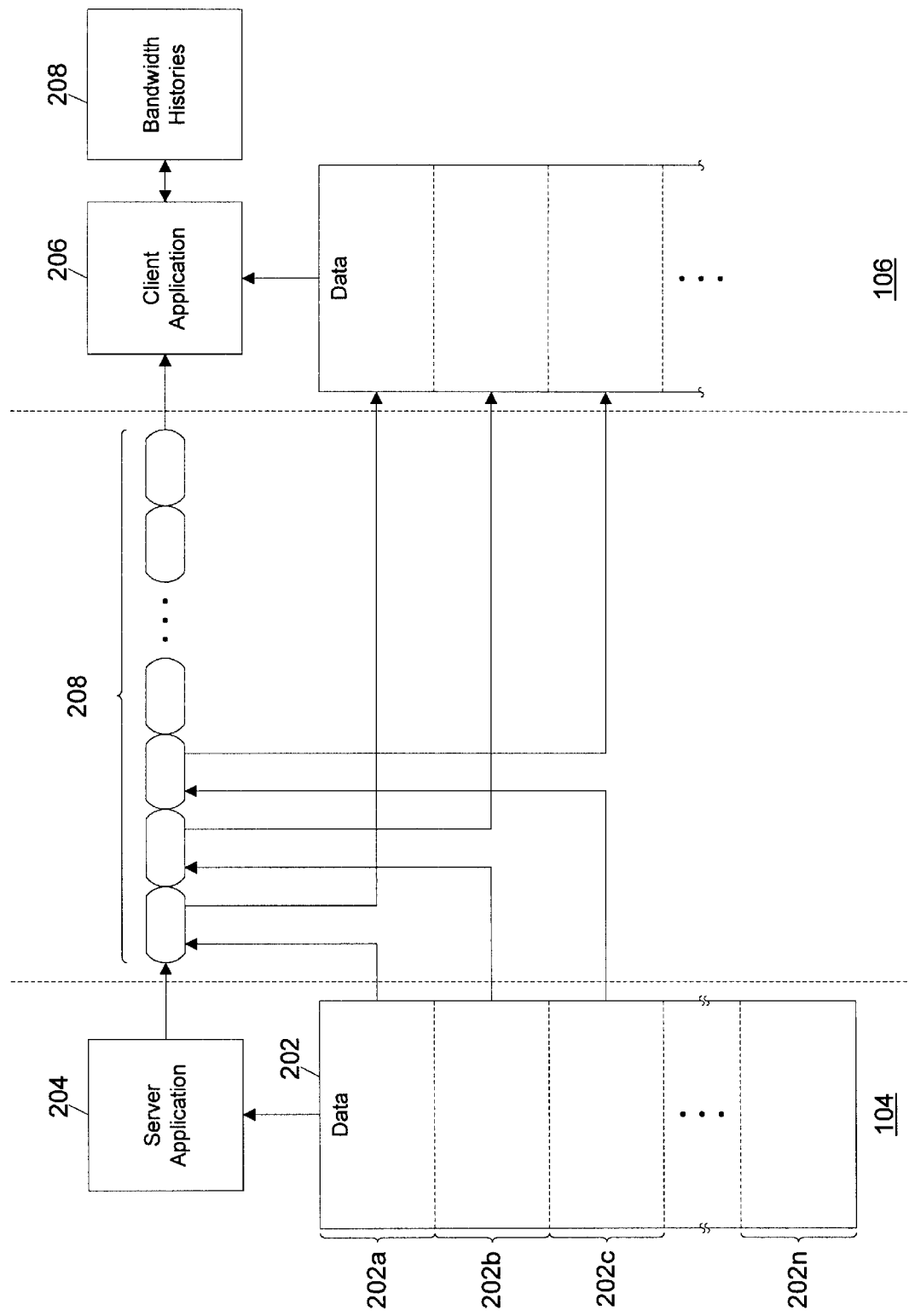
FIG. 2 is a diagram of a system for performing large data transfers over the Internet in accordance with a preferred embodiment of the present invention.

Referring to FIG. 2, a diagram of a system for performing large data transfers over the Internet in accordance with a preferred embodiment of the present invention is illustrated. A server application 204 executing within server system 104 receives a request for data 202 from client application 206 executing within client system 106. The data is transferred in segmented, parallel fashion as described below utilizing multiple "logical" threads transmitting through a single, physical channel 208 or optical fiber.

Clients downloading large files (more than 1 MB) may experience excessive transmission times caused at least in part by the sliding window limit utilized by TCP/IP. For example, a typical software product with 500 MB of code may require (500,000/160)=3215 sec≈52 minutes for a typical transfer within the United States as earlier described. Moreover, a client with full T3 bandwidth (45 Mb/s) available is only capable of running at 1.28 Mb/s, or about 3% of the bandwidth of the T3 connection.

To improve bandwidth utilization, a large data file 202 which is to be transferred is segmented into segments 202a–202n (where "n" may be any integer). The file may be segmented in advance of any transfer request, or segmentation may occur as a result of a client TCP/IP transfer request, with the actual segmentation of the file being performed either prior to or concurrent with the transfer of the file. In response to the request, the server 204 begins normal transmission of the first segment 202a of data file 202. Server 204 may then measure round trip times for packets/acknowledgments during the first several seconds of the transfer (ping times may be utilized instead for simplicity) to determine the backbone limit B, calculates the sustained transmission bandwidth $T_{i-n}$ for the segment transfer (where n is the total number of data streams being employed for transfer at the time the evaluation is being made and i is the number of a particular data stream—i.e., $T_{1-1}$ for transmission of the first segment 202a alone) from the packet size(s) and transmission times (e.g., using byte counts and clock times), and compares the utilized transmission bandwidth $T_{1-1}$ to the ratio B given by the sliding window divided by the (average or mean) round trip time.

If the transmission bandwidth $T_{1-1}$ utilized by the transfer of the first segment is close to the backbone limit ratio B (e.g., within some relative range such as a difference of 10–20% or less between $T_{1-1}$ and B), then server 204 immediately begins transferring the second segment 202b of the data file 202 in a logically distinct transfer process (but utilizing the same physical medium and communications path between server system 104 and client system 106). Round trip times for packet-acknowledgment pairs within both transfers and/or the ping time are measured and the individual transmission bandwidths $T_{i-n}$ ($T_{1-2}$ for the first segment 202a and $T_{2-2}$ for the second segment 202b) are calculated, together with the aggregate transmission bandwidth $T_{Total}$ for both transfers during the period of concurrent transmission (computed by suming the individual transmission bandwidths $T_{i-n}$).

The individual transmission bandwidths $T_{i-n}$ are then compared to the backbone limit B, and the aggregate transmission bandwidth $T_{Total-2}$ is compared to prior individual transmission bandwidth $T_{1-1}$ for transmission of the first segment 202a alone. If the individual transmission bandwidths $T_{1-2}$ and $T_{2-2}$ of each data stream are measured close to the backbone limit B, and if the aggregate transmission bandwidth $T_{Total-2}$ for both data streams is substantially greater than the initial individual transmission bandwidth $T_{1-1}$ for transmission of segment 202a alone, transmission of the third segment 202c is initiated. If $T_N$ is the aggregate transmission bandwidth for N data streams and $T_M$ is the aggregate transmission bandwidth for M data streams, a determination of whether the aggregate transmission bandwidth for N data streams is sufficiently greater than the aggregate transmission bandwidth for M data streams to warrant adding yet another data stream may be made from:

$$\frac{T_N - T_M}{T_M} > 0.10\left(\frac{N-M}{N}\right)$$

For example, were 1 data stream has been increased to 2 data streams as described above, the determination of whether the improvement in aggregate transmission bandwidth utilization was sufficiently improved to warrant starting a third data stream would be made from the calculation:

$$\frac{T_2 - T_1}{T_1} > 0.10\left(\frac{2-1}{1}\right)$$

where $T_2$ is the aggregate transmission bandwidth for two data streams (i.e., $T_{Total-2}$) and $T_1$ is the aggregate transmission bandwidth for one data stream (i.e., $T_{1-1}$).

Once again the individual transmission bandwidths $T_{i-n}$ ($T_{1-3}$ for transfer of segment 202a, $T_{2-3}$ for transfer of segment 202b, and $T_{3-3}$ for transfer of segment 202c) and aggregate transmission bandwidth $T_{Total-3}$ for the three concurrent transfers are calculated. If the individual transmission bandwidths $T_{i-n}$ are still measured close to the backbone limit B and the aggregate transmission bandwidth $T_{Total-3}$ exceeds the aggregate transmission bandwidth $T_{Total-2}$ for only two concurrent data streams by a sufficient amount, transmission of a fourth segment of data file 202 is initiated within a fourth logical data transfer. This process is repeated until either transfer of the last segment 202n of the full file 202 has been started or until adding an additional data stream for another segment will not significantly increase the aggregate bandwidth $T_{Total-n}$ of all concurrent segment transfers. Within each data stream, when transfer of one segment is completed, transfer of another file segment is initiated within that data stream. All data streams which are started are utilized to transfer file segments until a data stream is deliberately terminated or no further file segments exist.

The addition of each new data stream transferring a different segment as described produces diminishing returns in available bandwidth utilization. The data streams each compete with each other for a portion of the available bandwidth. As each transfer of a different segment within a new data stream is initiated, the individual transmission bandwidths $T_{i-n}$ may become significantly lower than the backbone limit B, at which time the initiation of any further data streams for the file transfer may optionally be terminated.

More significant, however, is the effect of each new data stream on the aggregate bandwidth $T_{Total-n}$ of all data streams. By tracking the impact of each new data stream on the aggregate bandwidth $T_{Total-n}$, a prediction may be made of whether adding another data stream is either unlikely to produce a significant increase in aggregate bandwidth or even likely to decrease the aggregate bandwidth. In either situation, initiation of other data streams to transfer file segments is terminated, allowing close to the maximum possible bandwidth utilization (aggregate bandwidth for concurrent data streams) to be achieved.

Alternatively, the addition of new data streams to the file transfer may be terminated based on a combination of the individual transmission bandwidths $T_{i-n}$ dropping below the backbone limit B to an unacceptable degree and the aggregate bandwidth $T_{Total-n}$ increasing less than a desired amount upon addition of the most recently started data stream. The particular criteria employed may vary depending upon the design.

Server application 204 transmits the selected number of segments concurrently to client application 206, which should be configured to receive large files in multiple segments utilizing logically distinct transmission processes over the same physical medium and communications path, then combine all segments to reconstruct the original large file 202. If the file 202 is divided into more segments 202a–202n than the number of distinct data streams which are employed for transmission, server application 204 will begin transfer of the next segment for which transfer has not already been initiated upon completing transfer of a previous segment. Client application 206 will typically receive the first segment 202a from server application 204 as a direct response to a request for data file 202, but may receive subsequent segments 202b–202n through one or more server push operations.

Figure 3:
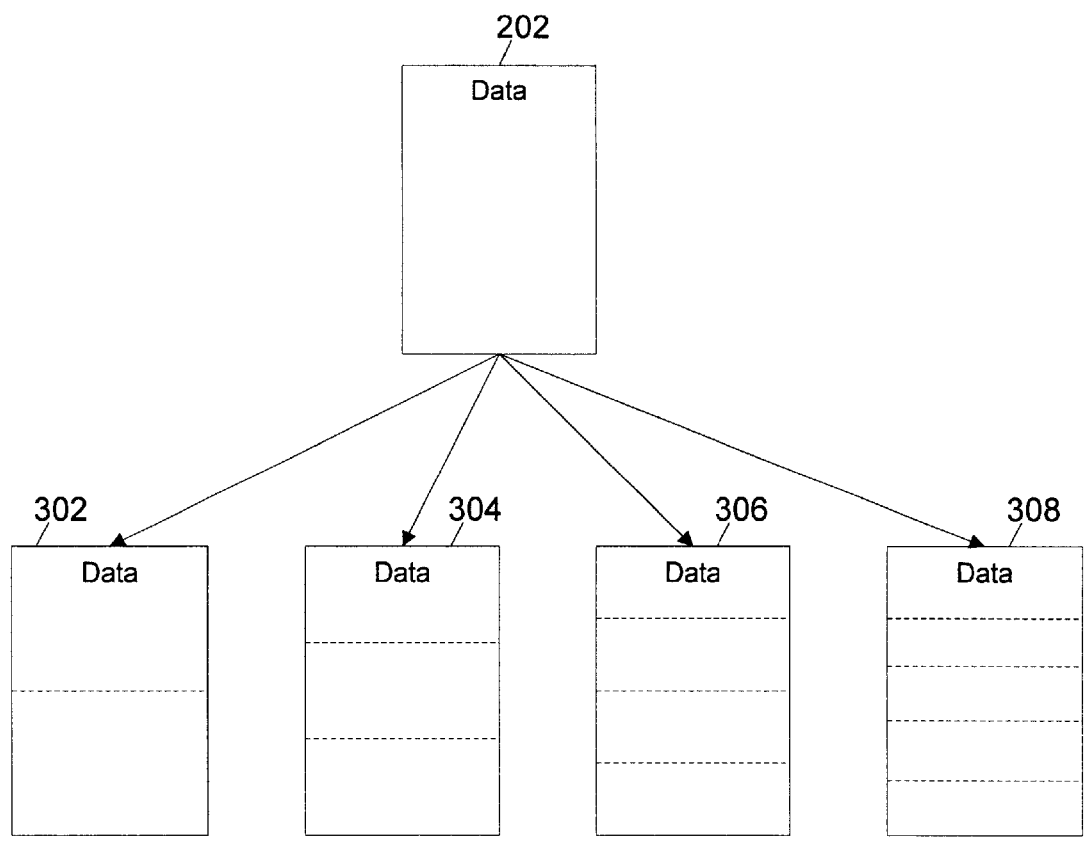
FIG. 3 depicts a diagram of segmentation of large data blocks for transmission in concurrent data streams over the Internet in accordance with a preferred embodiment of the present invention.

With reference now to FIG. 3, which is intended to be read in conjunction with the prior figures, a diagram of segmentation of large data blocks for transmission in concurrent data streams over the Internet in accordance with a preferred embodiment of the present invention is depicted. Large files are segmented, either by the transmitting server in response to a request or by a utility employed to "publish" the large files onto the transmitting server, into a number of pieces to support clients whose optimum number of data streams ranges from 2 and up. The segment sizes employed in dividing a data file 202 need not be equal.

For instance, segmenting a file into 3 pieces would enable only 1, 2 or 3 concurrent data streams to be employed during transmission, with clients optimized at 2 having to download the third segment individually, providing sub-optimal improvement of bandwidth utilization. Similarly dividing the file into 4 segments would be optimal for clients supporting 2 concurrent data streams, but not for clients supporting 3 data streams since the last segment would again be downloaded individually. Segmenting the file into 6 pieces, however, allows fully optimized downloads for any clients performing best with either 2 or 3 data streams; similarly, dividing the file into 12 segments would allow fully optimized download in any of 2, 3 or 4 data streams.

In general, a suitable number of segments may be determined from the maximum number n of concurrent data streams to be supported by calculating n!. For a client system supporting up to 5 concurrent data streams, for example, the file could be divided into 5!, or 120, segments. Such segmentation would support optimized downloads by 1, 2, 3, 4, 5, 6, 10, 12, 15, 20, 30, 40 or 60 simultaneous data streams. However, generally only very large files and very high bandwidth clients will warrant the use of 5 concurrent data streams.

Alternatively, the data file 202 may be divided, either in advance or upon receiving a request for the file, into a number segments equaling the number of data streams optimally supported by the client. Multiple copies 302, 304, 306, and 308 of data file 202, each segmented into a different number of segments, may be maintained by server system 104. The appropriate copy 302, 304, 306, and 308 may then be selected for transmission in response to each specific request. However, the number of data streams employed should be fixed at the time transfer of data file 202 is initiated for such segmentation. Unlike the segmentation scheme described above (n!), dynamic changes to the number of data streams during transmission of a file segmented into a number of pieces equaling the original number of data streams will degrade effectiveness.

Referring back to FIG. 2, server application 204 and client application 206 cooperate in determining the number of data streams (and therefore the number of segments) which should be employed for the transfer of large data file 202. While server application 204 will generally seek to utilize the largest number of data streams providing the best available bandwidth utilization possible, segmentation of the file may constrain the number of data streams employed. For example, if data file 202 is segmented into only 12 portions, optimized for 2, 3, or 4 data streams, server application 204 would not start a fifth data stream despite any calculations predicting bandwidth utilization increases. Total transmission time would not be significantly improved under such circumstances, but network loading caused by the transmission would be increased for a portion of the transfer rather than generally equalized over the duration of the transfer.

Client application 206 may maintain bandwidth histories 208 between the client system 106 and the priority servers from which the client system 106 has recently downloaded large files. When returning to a server for which an historical performance was stored within bandwidth histories 208, the transmission of a large data file 202 may be started at 50–75% of the data stream count for prior transfers, then adding additional data streams (singly or, in an environment warranting a large number of streams such as T3 connections, in pairs or even more) while monitoring the impact on bandwidth utilization as described above.

Client application 206 may communicate either historical performance from bandwidth histories 208 or an identification of an initial number of data streams with each request to server application 204, allowing the data transfer to be initiated with multiple data streams as described above. Additionally, server system 104 may maintain performance or bandwidth histories for clients which receive recurring data transfers.

Since ping times and bandwidth availability may change during transmission of a large file (due to changes in traffic and/or network loading, for instance), downloads are continuously tracked and the number of data streams is adjusted, if necessary, over time. Each time a data stream completes transmission of a segment, the transmission of another segment within that data stream is delayed long enough to determine whether the aggregate bandwidth $T_{Total-n-1}$ of the remaining data streams rises to roughly the aggregate bandwidth $T_{Total-n}$ of all data streams prior to completion of transfer for the just-completed segment. If so, the data stream which just completed transfer of a segment may be halted, depending on the number of file segments remaining; if not, transmission of another segment on the data stream is initiated. The determination may be made utilizing the same formula given above for deciding whether to add an additional data stream. As a practical matter, however, dynamic changes to the number of data streams after transfer of the first few file segments has been initiated (i.e., after some initial optimal number of data streams has been determined and started) will only be useful for a large and/or highly segmented data file.

If the number of file segments remaining to be transferred would negate any benefit to halting a data stream, transfer of another segment over the data stream which just completed transfer of a previous segment may be initiated despite any rise in the aggregate bandwidth of the remaining data streams. For example, if three data streams had been utilized and nine (out of twelve) file segments remained to be transferred, server application 204 might continue to utilize three data streams until only six file segments remained before reducing the number of data streams to two.

Figure 4A:
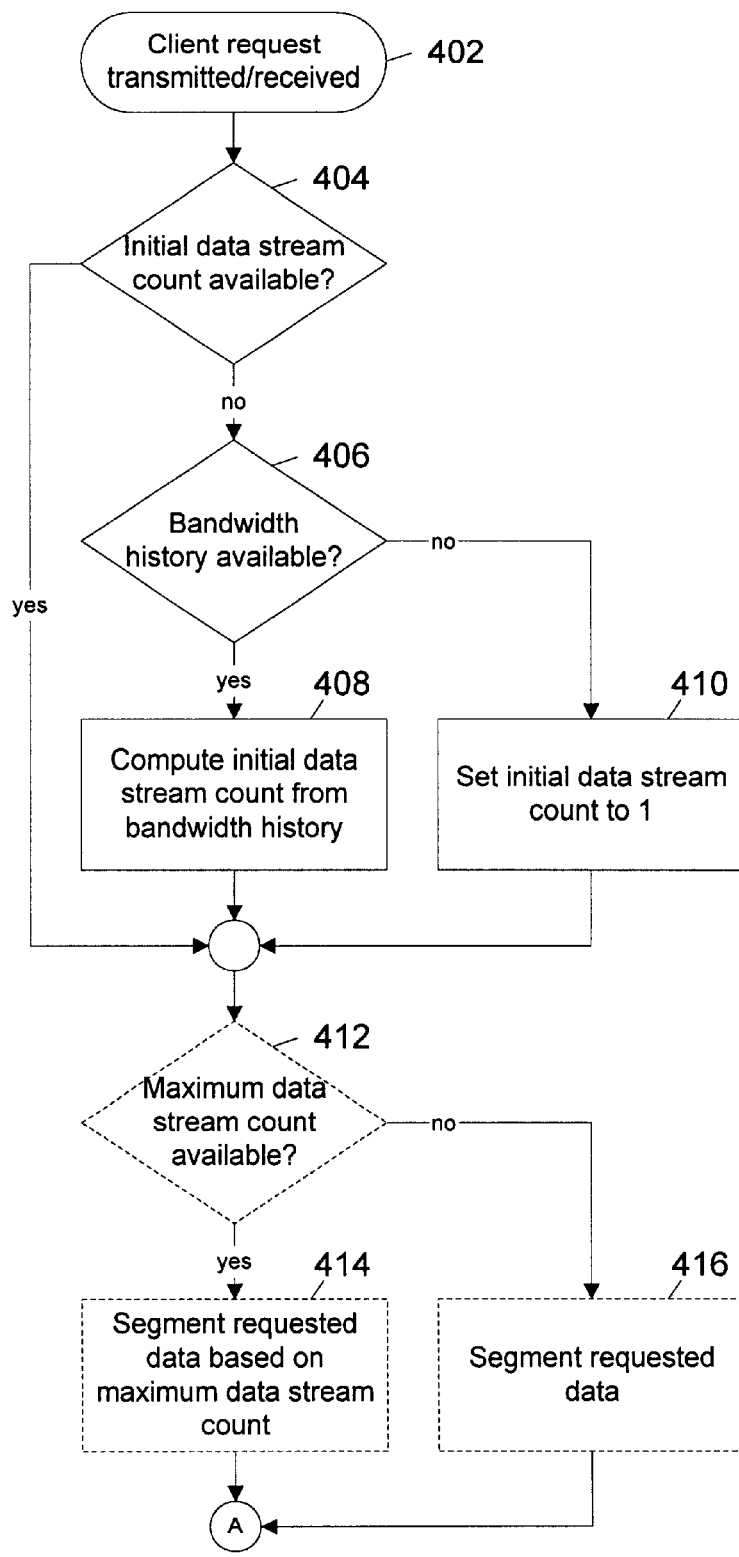
FIGS. 4A–4C are a high level flow chart for a process of transmitting large data files over a TCP/IP network such as the Internet in accordance with a preferred embodiment of the present invention.
Figure 4B:
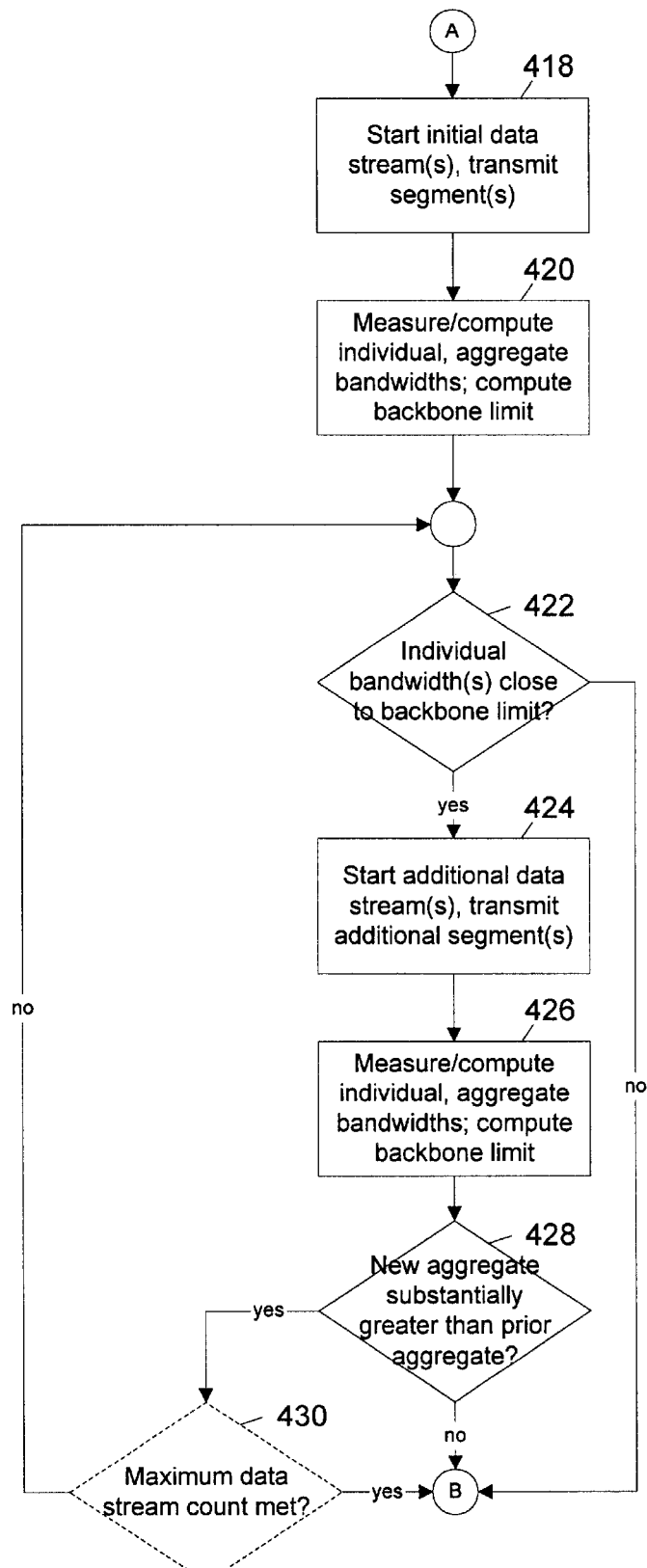
Figure 4C:
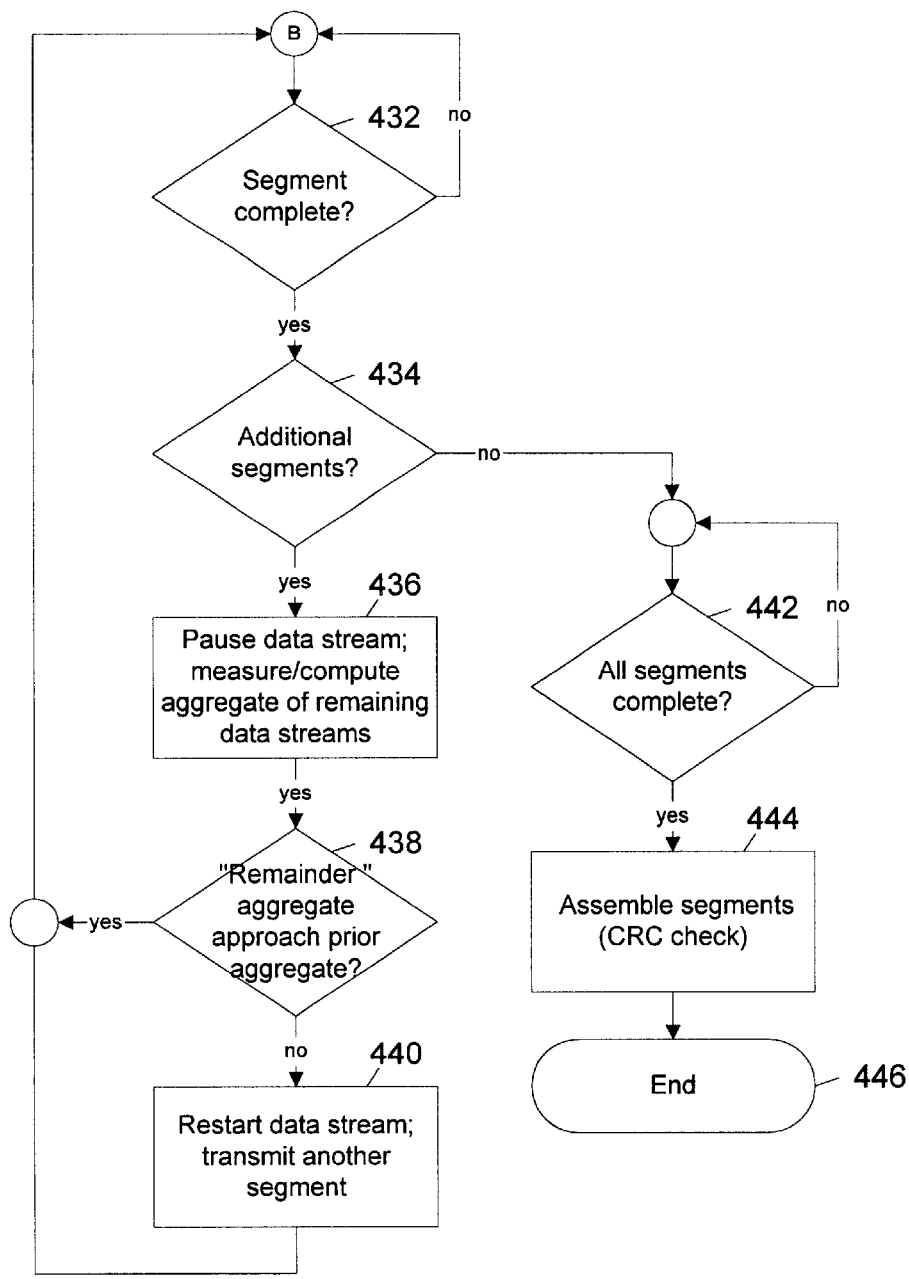

Referring to FIGS. 4A through 4C, a high level flow chart for a process of transmitting large data files over a TCP/IP network such as the Internet in accordance with a preferred embodiment of the present invention is illustrated. The process begins at step 402, which depicts a client request for a large file (greater than 1 MB) being transmitted and received. The client request may include a bandwidth performance history for previous downloads between the subject client-server pair, or a number of initial data streams to be employed. The client request may also include a maximum data stream count supported by the client for concurrent data streams (e.g., a historical maximum for downloads from any server, a number of processors or network adapters, or simply some setting within the client application for maximum data stream count).

Is The process first proceeds to step 404, which illustrates a determination of whether an initial data stream count is available, either from the client or the server. If so, the process skips to optional step 412, described below. If not, however, the process proceeds to step 406, which depicts a determination of whether bandwidth performance history— either in general for the client, in general for the server, or for the subject client-server pair—is available (from either the client or server). If bandwidth performance history is available, the process proceeds to step 408, which illustrates computing an initial data stream count from the bandwidth history. If no initial data stream count and no bandwidth history is available, however, the process proceeds instead to step 410, which depicts setting the initial data stream count to 1.

The process next passes to optional step 412, which illustrates a determination of whether a maximum data stream count is available (either from the client or the server). Maximum data stream counts may be specified for either the client or the server based on a number of processors or network adapters available within the respective system or based on other criteria. If a maximum data stream count is available, the process may proceed to step 414, which depicts segmenting the requested data file based on the maximum data stream count. If no maximum data stream count is available, the process proceeds instead to step 416, which illustrates segmenting the requested data file. If no maximum data stream count is specified for either the client or server, the file is segmented utilizing a predicted maximum data stream count in the manner described above.

Steps 414 and 416 are optional in that the requested data file may have been previously segmented. If no maximum data stream count is supported by a particular implementation, the process may proceed from steps 408 or 410 directly to step 416. In the exemplary embodiment, the process proceeds from steps 414 or 416, or from step 412 if the requested data was previously segmented, to step 418, which illustrates starting a number of data streams equal to the initial data stream count and transmitting a different segment of the requested data file over each data stream. The process then passes to step 420, which depicts measuring ping times and transmission rates and computing individual and aggregate bandwidths, together with the backbone limit.

The process passes next to step 422, which illustrates a determination of whether the individual bandwidth(s) for the active data streams are close to the backbone limit, indicating that the backbone bandwidth is limiting available bandwidth utilization as a result of the sliding window and round trip times. If so, the process proceeds to step 424, which depicts an additional data stream being started and transmission of another segment of the requested data file being initiated, then to step 426, which illustrates once again measuring ping times and transmission rates, and computing individual and aggregate bandwidths and the backbone limit.

The process then passes to step 428, which depicts a determination of whether the aggregate bandwidth, with the additional data stream started in step 424, is substantially greater than the prior aggregate bandwidth without that additional data stream. If so, the process proceeds to step 430, which illustrates an optional determination of whether the maximum data stream count is met. This step may not be implemented if no maximum data stream count is specified. A maximum data stream count may be imposed to prevent "pigging" of available bandwidth by a recipient and resultant problems within the server system or network. The maximum data stream count may be implemented in an adjustable manner, but preferably require detailed familiarity with the process for alteration. If implemented, however, and the maximum data stream count is not met, the process returns to step 422 to repeat the determination regarding individual bandwidths and the backbone limit. Alternatively, the process might instead return to step 424 and simply start a new data stream. In the preferred embodiment, however, the individual transmission bandwidths are compared to the backbone limit before any additional data streams are started. If step 430 is not implemented, and the aggregate bandwidth with an additional data stream is substantially greater than the aggregate bandwidth without that additional data stream, the process proceeds from step 428 directly to step 422.

If the individual transmission bandwidths are not close to the backbone limit (step 422), or if the aggregate bandwidth with an additional data stream is not substantially greater than the aggregate bandwidth without that additional data stream (step 428), or if the maximum data stream count has been met (step 430), the process proceeds to step 432, which depicts a determination of whether transmission of any data segment has completed. If not, the process continues polling until transfer of a data segment is complete. Once a data segment is complete, the process proceeds to step 434, which illustrates a determination of whether additional segments remain to be transferred. If so, the process proceeds to step 436, which depicts the step of pausing the data stream which just completed transfer of a data segment, then measuring and computing the aggregate bandwidth of the remaining data streams.

The process passes then to step 438, which illustrates a determination of whether the aggregate bandwidth for the remaining data streams (other than the paused data stream) approaches the aggregate bandwidth of all data streams before the recent completion of a segment. If not, the process may then proceed to step 440, which depicts restarting the paused data stream and transmitting another file segment. From step 440, or from step 438 if the aggregate bandwidth of the data streams excluding the paused data stream does approach the prior aggregate bandwidth, the process passes back to step 432 to determine if and when transmission of a segment completes.

Referring back to step 434, once no additional segments remain to be transmitted, the process passes to step 442, which depicts a determination of whether transfer of all segments has completed. If not, the process continues polling until completion of all segments. Upon completion of all segments, the process proceeds to step 444, which illustrates assembling the segments on the client side to reproduce the requested content. Segment identifiers may be included in the transmitted segment for this purpose. Additionally, error checks such as a CRC and/or other validation methods may be utilized to test the transmitted data. The process then passes to step 446, which depicts the process becoming idle until another large file is requested.

The present invention enables automated concurrent download of a large file in segments over the Internet or similar communications systems employing TCP/IP, with the file being reconstructed from the segments at the receiving end. The client and server jointly control the number of concurrent data streams and/or the number of segments employed. Instantaneous transmission bandwidth and ping times are tracked and utilized, together with the sliding window, to determine the number of concurrent data streams which should be sustained in order to optimize the overall download time. The number of data streams employed is constrained to the lesser of the number of data streams which provides the best available bandwidth utilization possible or the maximum number of data streams for which the segmentation of the file is optimized.

When bandwidth is studied across the spectrum of client and server systems, the maximum bandwidth achievable may be approximated by the slower of: (i) the client to Internet =Service Provider (ISP) connection bandwidth; (ii) the server to ISP connection bandwidth; and (iii) the backbone bandwidth B. In the present invention, the backbone bandwidth is effectively eliminated as a limitation on achievable bandwidth by circumventing the constraint of the TCP/IP sliding window using multiple logical communications sessions. The bandwidth is increased to the lesser of the server to ISP connection bandwidth or the client to ISP connection bandwidth. This allows large files, segmented for transfer over separate data streams, to be transferred with a bandwidth greater than that available through a single data stream under the sliding window constraint.

To improve bandwidth utilization, the file should be segmented to provide optimal downloading utilizing various numbers of concurrent data streams, and is therefore preferably segmented based on the factorial for the maximum number of data streams to be supported. Such segmentation also facilitates changes to the number of data streams being employed dynamically during the file transfer.

In the present invention, overall download time is optimized utilizing network performance measures including ping time, current bandwidth measurements, recent transmission histories, current server loading (utilization), client loading, or some subset of these measures to determine the number of concurrent data streams which should be employed. The decision process may utilize fuzzy logic, artificial intelligence, or an expert system to process the data in setting the number of data streams. Bandwidth performance histories for downloads between client-server pairs may be maintained and employed for selecting an initial number of data streams.

Identification, authentication, message integrity verification, and optional privacy/encryption features may be integrated into the bandwidth optimization and data stream control of the present invention. Similarly, purchase, registration, configuration, public key request, and other communications or business processes may be also integrated. For downloads from multiprocessor systems, the multiple download threads for each data stream may be individually assigned and possibly pinned to distinct processors to improve overall download performance. Independent of whether the system is a multiprocessor system, the multiple download threads may also be associated with separate network adapters within either the client or server system to improve download performance.

Although described in the context of client-server systems above, the present invention may also be utilized in peer-to-peer transfers of large data files. Moreover, the present invention may be employed for data transfers over any TCP/IP network, not just the Internet.

Previous proposals for improving download bandwidth, such as parallel FTP and parallel HTTP, are client-side solutions. Parallel FTP is a client-only solution which seeks to improve transfer bandwidth by creating multiple, parallel FTP clients all communicating with the same server. However, the FTP server code is not altered in any way so that it can continue to conform to the standard, and thus would not allow parallel retrieval of a single large file, only multiple files. Additionally, all of the intelligence is restricted to the client, with the client deciding whether to employ download parallelism.

Parallel HTTP has only been implemented in a limited fashion. Commercially available browsers may create up to 4 concurrent but independent HTTP sessions when downloading a Web page with multiple graphic images. To speed up page transfer, the browser will create up to four separate HTTP sessions, each downloading a unique separate file. However, segmentation of a single large file and parallel retrieval of the portions is not supported.

The present invention differs from parallel FTP and parallel HTTP in that the logic which drives parallelism is embedded within the server as well as the client. With the present invention, the client need only be configured to reconstruct file segments. The server side of the session is modified (unlike parallel FTP or parallel HTTP) and controls the decision regarding how many concurrent data streams are started and when they are terminated. No theoretical limit on the number of concurrent data streams is set in the present invention, and the implementation is independent of the file transfer system with no inherent dependencies of FTP, HTTP, or any other protocol other than TCP/IP.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of transmitting data, comprising:
   initiating transfer of a large data file over a network utilizing an initial number of concurrent data streams;
   during transmission of the data file utilizing the initial number of concurrent data streams, determining individual transmission bandwidths for each of the initial number of concurrent data streams and an aggregate bandwidth for all of the concurrent data streams;
   comparing the individual transmission bandwidths to a backbone limit; and
   responsive to determining that the individual transmission bandwidths are approximately equal to the backbone limit, initiating an additional concurrent data stream to transfer a portion of the data file.

2. The method of claim 1, wherein the step of initiating transfer of a large data file over a network utilizing an initial number of concurrent data streams further comprises:
   initiating transfer of the data file utilizing a single data stream.

3. The method of claim 1, wherein the step of initiating transfer of a large data file over a network utilizing an initial number of concurrent data streams further comprises:
   initiating transfer of the data file utilizing more than one data stream.

4. The method of claim 1, wherein the step of comparing the individual transmission bandwidths to a backbone limit further comprises:
   determining a ping time; and
   computing the backbone limit utilizing a sliding window setting and the ping time.

5. The method of claim 1, wherein the step of determining individual transmission bandwidths for each of the initial number of concurrent data streams and an aggregate bandwidth for all of the concurrent data streams further comprises:
   computing the individual transmission bandwidths from byte counts and clock times; and
   computing the aggregate transmission bandwidth by summing the individual transmission bandwidths.

6. The method of claim 1, further comprising:
   (a) transmitting the data file by concurrently utilizing a number of active data streams equal to the initial number plus one;
   (b) during transmission of the data file utilizing the active data streams, determining individual transmission bandwidths for each active data stream and an aggregate bandwidth for all of the active data streams;
   (c) determining whether the individual transmission bandwidths are approximately equal to the backbone limit;
   (d) determining whether the aggregate bandwidth for all active data streams is substantially greater than the aggregate bandwidth for all of a prior number of active data streams; and
   (e) responsive to determining that the aggregate bandwidth for all active data streams is substantially greater than the aggregate bandwidth for all of the prior number of active data streams and that the individual transmission bandwidths are approximately equal to the backbone limit, initiating another data stream and transmitting an additional segment of the file over the other data stream.

7. The method of claim 6, further comprising:
   repeating steps (a) through (e) until the aggregate bandwidth for all active data streams is not substantially greater than the aggregate bandwidth for all of the prior number of active data streams.

8. The method of claim 6, further comprising:

determining a specified maximum data stream count from a system originating the large data file; and repeating steps (a) through (e) until either the aggregate bandwidth for all active data streams is not substantially greater than the aggregate bandwidth for all of the prior number of active data streams or the maximum data steam count is reached.

9. The method of claim 1, further comprising:

upon completion of transmission of a file segment over a data stream, pausing the data stream;

during transmission of file segments over only the remaining data streams, determining whether an aggregate bandwidth for all remaining data streams rose to approximately equal the aggregate bandwidth for all active data streams prior to completion of transmission of the file segment;

responsive to determining that the aggregate bandwidth for all remaining data streams did not rise to approximately equal the aggregate bandwidth for all active data streams prior to completion of transmission of the file segment, beginning transmission of another file segment over the data stream; and responsive to determining that the aggregate bandwidth for all remaining data streams rose to approximately equal the aggregate bandwidth for all active data streams prior to completion of transmission of the file segment, terminating the data stream.

10. The method of claim 1, further comprising:

prior to or while initiating transfer of the data file, logically dividing the data file into segments for concurrent transmission over the data streams; and concurrently transmitting a segment of the data file over each data stream.

11. The method of claim 10, wherein the step of logically dividing the data file into segments for concurrent transmission over the data streams further comprises:

segmenting the data file based on a factorial of a maximum number of data streams.

12. The method of claim 10, further comprising:

after receiving all segments of the data file, assembling the segments of the data file to reproduce the data file.

13. The method of claim 1, further comprising:

reading historic bandwidth records for transfers between a receiving system and an originating system between which the large data file is being transferred; and setting the initial number of concurrent data streams based upon the historic bandwidth records.

14. The method of claim 1, further comprising:

utilizing at least one of ping time, current bandwidth utilization measurements, recent transmission histories, current server loading, and current client loading to determine an optimal number of data streams for transfer of the large data file.

15. The method of claim 14, further comprising:

determining the optimal number of data streams for transfer of the large data file utilizing fuzzy logic, artificial intelligence, or an expert system.

16. The method of claim 1, further comprising:

integrating identification authentication, message integrity verification, or encryption into transfer of the large data file.

17. The method of claim 1, further comprising:

integrating a purchase, registration, configuration, or a key request into transfer of the large data file.

18. A system for transmitting data, comprising:

an originating system;

a receiving system;

a TCP/IP network coupling the originating system and the receiving system;

an initial number of concurrent data streams between the originating system and the receiving system on the network each transmitting a segment of a large data file;

logic within either the originating system or the receiving system for determining individual transmission bandwidths for each of the initial number of concurrent data streams and an aggregate bandwidth for all of the concurrent data streams during transmission of the data file utilizing the initial number of concurrent data streams;

logic within either the originating system or the receiving system for comparing the individual transmission bandwidths to a backbone limit; and logic within either the originating system or the receiving system for initiating an additional concurrent data stream to transfer a portion of the data file responsive to determining that the individual transmission bandwidths are approximately equal to the backbone limit.

19. The system of claim 18, wherein the logic for initiating transfer of a large data file over a TCP/IP network utilizing an initial number of concurrent data streams further comprises:

logic initiating transfer of the data file utilizing a single data stream.

20. The system of claim 18, wherein the logic for initiating transfer of a large data file over a TCP/IP network utilizing an initial number of concurrent data streams further comprises:

initiating transfer of the data file utilizing more than one data stream.

21. The system of claim 18, wherein the logic for comparing the individual transmission bandwidths to a backbone limit further comprises:

logic determining a ping time; and logic computing the backbone limit utilizing a sliding window setting.

22. The system of claim 18, wherein the logic for determining individual transmission bandwidths for each of the initial number of concurrent data streams and an aggregate bandwidth for all of the concurrent data streams further comprises:

logic computing the individual transmission bandwidths from byte counts and clock times; and logic computing the aggregate transmission bandwidth by summing the individual transmission bandwidths.

23. The system of claim 18, further comprising logic for performing the steps of:

(a) transmitting the data file by concurrently utilizing a number of active data streams equal to the initial number plus one;

(b) during transmission of the data file utilizing the active data streams, determining individual transmission bandwidths for each active data stream and an aggregate bandwidth for all of the active data streams;

(c) determining whether the individual transmission bandwidths are approximately equal to the backbone limit;

(d) determining whether the aggregate bandwidth for all active data streams is substantially greater than the aggregate bandwidth for all of a prior number of active data streams; and (e) responsive to determining that the aggregate bandwidth for all active data streams is substantially greater than the aggregate bandwidth for all of the prior number of active data streams and that the individual transmission bandwidths are approximately equal to the backbone limit, initiating another data stream and transmitting an additional segment of the file over the other data stream.

24. The system of claim 23, further comprising:

logic repeating steps (a) through (e) until the aggregate bandwidth for all active data streams is not substantially greater than the aggregate bandwidth for all of the prior number of active data streams.

25. The system of claim 23, further comprising:

logic determining a specified maximum data stream count from a system originating the large data file; and logic repeating steps (a) through (e) until either the aggregate bandwidth for all active data streams is not substantially greater than the aggregate bandwidth for all of the prior number of active data streams or the maximum data steam count is reached.

26. The system of claim 18, further comprising:

logic pausing a data stream upon completion of transmission of a file segment over that data stream;

logic determining, during transmission of file segments over only the remaining data streams, whether an aggregate bandwidth for all remaining data streams rose to approximately equal the aggregate bandwidth for all active data streams prior to completion of transmission of the file segment;

logic beginning transmission of another file segment over the data stream in response to determining that the aggregate bandwidth for all remaining data streams did not rise to approximately equal the aggregate bandwidth for all active data streams prior to completion of transmission of the file segment; and logic terminating the data stream in response to determining that the aggregate bandwidth for all remaining data streams rose to approximately equal the aggregate bandwidth for all active data streams prior to completion of transmission of the file segment.

27. The system of claim 18, further comprising:

logic dividing the data file into logical segments for concurrent transmission over the data streams prior to or while initiating transfer of the data file; and logic concurrently transmitting a segment of the data file over each data stream.

28. The system of claim 27, wherein the logic dividing the data file into logical segments for concurrent transmission over the data streams further comprises:

logic segmenting the data file based on a factorial of a maximum number of data streams.

29. The system of claim 27, further comprising:

logic assembling the segments of the data file at the receiving system to reproduce the data file after receiving all segments of the data file.

30. The system of claim 18, further comprising:

logic reading historic bandwidth records for transfers between a receiving system and an originating system between which the large data file is being transferred; and logic setting the initial number of concurrent data streams based upon the historic bandwidth records.

31. An article of manufacture for use in transmitting data, the article of manufacture comprising computer readable storage media including program logic embedded therein that causes control circuitry to perform the steps of:

initiating transfer of a large data file over a TCP/IP network utilizing an initial number of concurrent data streams;

during transmission of the data file utilizing the initial number of concurrent data streams, determining individual transmission bandwidths for each of the initial number of concurrent data streams and an aggregate bandwidth for all of the concurrent data streams;

comparing the individual transmission bandwidths to a backbone limit; and responsive to determining that the individual transmission bandwidths are approximately equal to the backbone limit, initiating an additional concurrent data stream to transfer a portion of the data file.

* * * * *